US012675620B2

(12) United States Patent
Hunziker et al.

(10) Patent No.: US 12,675,620 B2
(45) Date of Patent: Jul. 7, 2026

(54) METHOD AND SYSTEM FOR DETERMINING PLY-BY-PLY DAMAGE IN A COMPOSITE STRUCTURE

(71) Applicant: The Boeing Company, Chicago, IL (US)

(72) Inventors: Kenneth J. Hunziker, Issaquah, WA (US); Jenna K. Pang, Bellevue, WA (US)

(73) Assignee: The Boeing Company, Arlington, VA (US)

( * ) Notice: Subject to any disclaimer, the term of this patent is extended or adjusted under 35 U.S.C. 154(b) by 1052 days.

(21) Appl. No.: 17/845,283

(22) Filed: Jun. 21, 2022

(65) Prior Publication Data

US 2023/0409780 A1 Dec. 21, 2023

(51) Int. Cl.
| | |
|---|---|
| *G06F 30/23* | (2020.01) |
| *G06F 30/20* | (2020.01) |
| *G06F 30/27* | (2020.01) |
| *G06F 113/26* | (2020.01) |
| *G06F 119/02* | (2020.01) |

(52) U.S. Cl.
CPC .............. *G06F 30/23* (2020.01); *G06F 30/20* (2020.01); *G06F 30/27* (2020.01); *G06F 2113/26* (2020.01); *G06F 2119/02* (2020.01)

(58) Field of Classification Search
CPC .......... G06F 30/23; G06F 30/20; G06F 30/27; G06F 2113/26; G06F 2119/02; G06F 2119/14; G06N 20/00; G16C 60/00
See application file for complete search history.

(56) References Cited

U.S. PATENT DOCUMENTS

| | | | |
|---|---|---|---|
| 10,691,848 B2 | 6/2020 | Hunziker et al. | |
| 2015/0354925 A1* | 12/2015 | Van Heerden | .......... B32B 5/024 |
| | | | 428/113 |
| 2019/0258752 A1* | 8/2019 | Hunziker | ................ G06F 7/544 |
| 2020/0264071 A1* | 8/2020 | Ihn | ............................ B64F 5/60 |
| 2023/0113537 A1* | 4/2023 | Horita | ................... G06T 7/0002 |
| | | | 382/100 |

OTHER PUBLICATIONS

Russo, Pietro, et al. "Characterization of 'green'composite laminates after flexural tests by speckle interferometry." Optical Engineering 59.10 (2020): 102416-102416. (Year: 2020).*

* cited by examiner

*Primary Examiner* — Michael Edward Cocchi
(74) *Attorney, Agent, or Firm* — Harrity & Harrity, LLP

(57) ABSTRACT

A computer-implemented method that facilitates determining ply-by-ply damage in a composite structure comprises receiving, by a computing system, a geometric model that specifies geometric aspects of a composite structure. The geometric model facilitates the performance of finite element analysis (FEA). FEA logic of the computing system applies each of a plurality of material failure models (MFMs) to the geometric model to predict different types of damage to the composite structure due to an applied force or stress. Each MFM relates a force or stress applied to a material to a particular type of damage to the material. The machine learning logic predicts, based on each of the predicted different types of damage, an aggregate prediction of damage to the composite structure.

20 Claims, 5 Drawing Sheets

305C

305B

305A

170

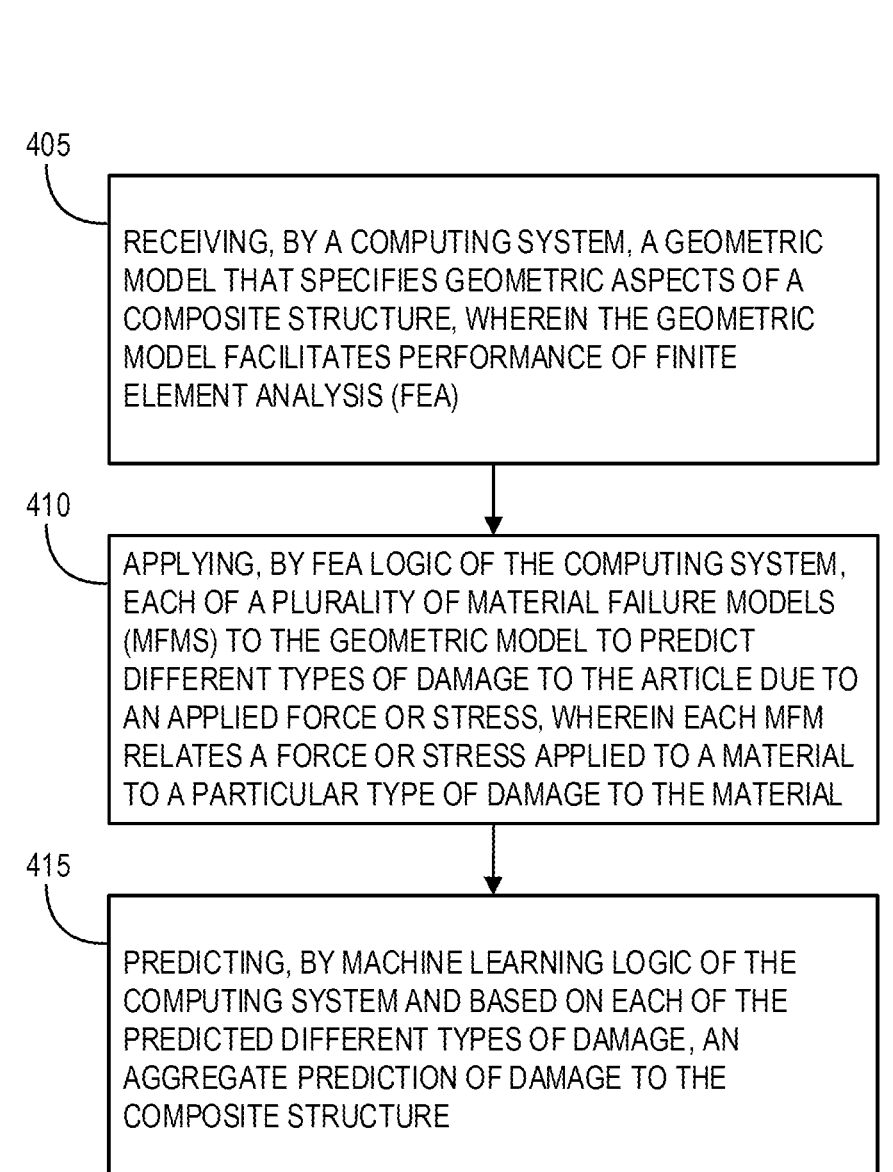

400

405

RECEIVING, BY A COMPUTING SYSTEM, A GEOMETRIC MODEL THAT SPECIFIES GEOMETRIC ASPECTS OF A COMPOSITE STRUCTURE, WHEREIN THE GEOMETRIC MODEL FACILITATES PERFORMANCE OF FINITE ELEMENT ANALYSIS (FEA)

410

APPLYING, BY FEA LOGIC OF THE COMPUTING SYSTEM, EACH OF A PLURALITY OF MATERIAL FAILURE MODELS (MFMS) TO THE GEOMETRIC MODEL TO PREDICT DIFFERENT TYPES OF DAMAGE TO THE ARTICLE DUE TO AN APPLIED FORCE OR STRESS, WHEREIN EACH MFM RELATES A FORCE OR STRESS APPLIED TO A MATERIAL TO A PARTICULAR TYPE OF DAMAGE TO THE MATERIAL

415

PREDICTING, BY MACHINE LEARNING LOGIC OF THE COMPUTING SYSTEM AND BASED ON EACH OF THE PREDICTED DIFFERENT TYPES OF DAMAGE, AN AGGREGATE PREDICTION OF DAMAGE TO THE COMPOSITE STRUCTURE

Fig. 4

METHOD AND SYSTEM FOR DETERMINING PLY-BY-PLY DAMAGE IN A COMPOSITE STRUCTURE

BACKGROUND

Field

This application generally relates to the analysis of damage to structural components. In particular, this application describes examples of methods and systems that facilitate determining ply-by-ply damage in a composite structure.

Description of Related Art

Conventional finite element analysis (FEA) techniques can be used to generate a reasonable prediction of damage in some types of structures, such as those that comprise single isotropic materials. However, the prediction of damage to structures that comprise composite materials has proved to be challenging. For example, many conventional composite structures do not comprise single isotropic materials. These structures may comprise plies of various shapes and sizes, and these plies may be formed from different materials. With such multi-layered composite structures, each different material and layer can and usually does behave differently under different stresses and loads.

Due to the extremely complex interaction of the constituent materials of the composite structure, the response of each individual material and layer to stress or load is difficult to predict.

SUMMARY

In a first aspect, a computer-implemented method that facilitates determining ply-by-ply damage in a composite structure comprises receiving, by a computing system, a geometric model that specifies geometric aspects of a composite structure. The geometric model facilitates the performance of finite element analysis (FEA). FEA logic of the computing system applies each of a plurality of material failure models (MFMs) to the geometric model to predict different types of damage to the composite structure due to an applied force or stress. Each MFM relates a force or stress applied to a material to a particular type of damage to the material. The machine learning logic predicts, based on each of the predicted different types of damage, an aggregate prediction of damage to the composite structure.

In a second aspect, a computing system that facilitates determining ply-by-ply damage in a composite structure comprises one or more instruction storage devices for storing instruction code; and one or more processors in communication with the one or more instruction storage devices. Execution of the instruction code by the processors causes the computing system to perform operations comprising receiving, by the computing system, a geometric model that specifies geometric aspects of a composite structure. The geometric model facilitates the performance of finite element analysis (FEA). FEA logic of the computing system applies each of a plurality of material failure models (MFMs) to the geometric model to predict different types of damage to the composite structure due to an applied force or stress. Each MFM relates a force or stress applied to a material to a particular type of damage to the material. The machine learning logic predicts, based on each of the predicted different types of damage, an aggregate prediction of damage to the composite structure.

In a third aspect, a non-transitory computer-readable medium stores instruction code that facilitates determining ply-by-ply damage in a composite structure. Execution of the instruction code by one or more processors of a computing system causes the computing system to perform operations comprising receiving, by a computing system, a geometric model that specifies geometric aspects of a composite structure. The geometric model facilitates the performance of finite element analysis (FEA). FEA logic of the computing system applies each of a plurality of material failure models (MFMs) to the geometric model to predict different types of damage to the composite structure due to an applied force or stress. Each MFM relates a force or stress applied to a material to a particular type of damage to the material. The machine learning logic predicts, based on each of the predicted different types of damage, an aggregate prediction of damage to the composite structure.

The foregoing summary is illustrative only and is not intended to be in any way limiting. In addition to the illustrative aspects, embodiments, and features described above, further aspects, embodiments, and features will become apparent by reference to the figures and the following detailed description and the accompanying drawings.

BRIEF DESCRIPTION OF THE DRAWINGS

FIG. 4 illustrates operations performed by one or more devices described herein, in accordance with example embodiments.

DETAILED DESCRIPTION

Figure 1:
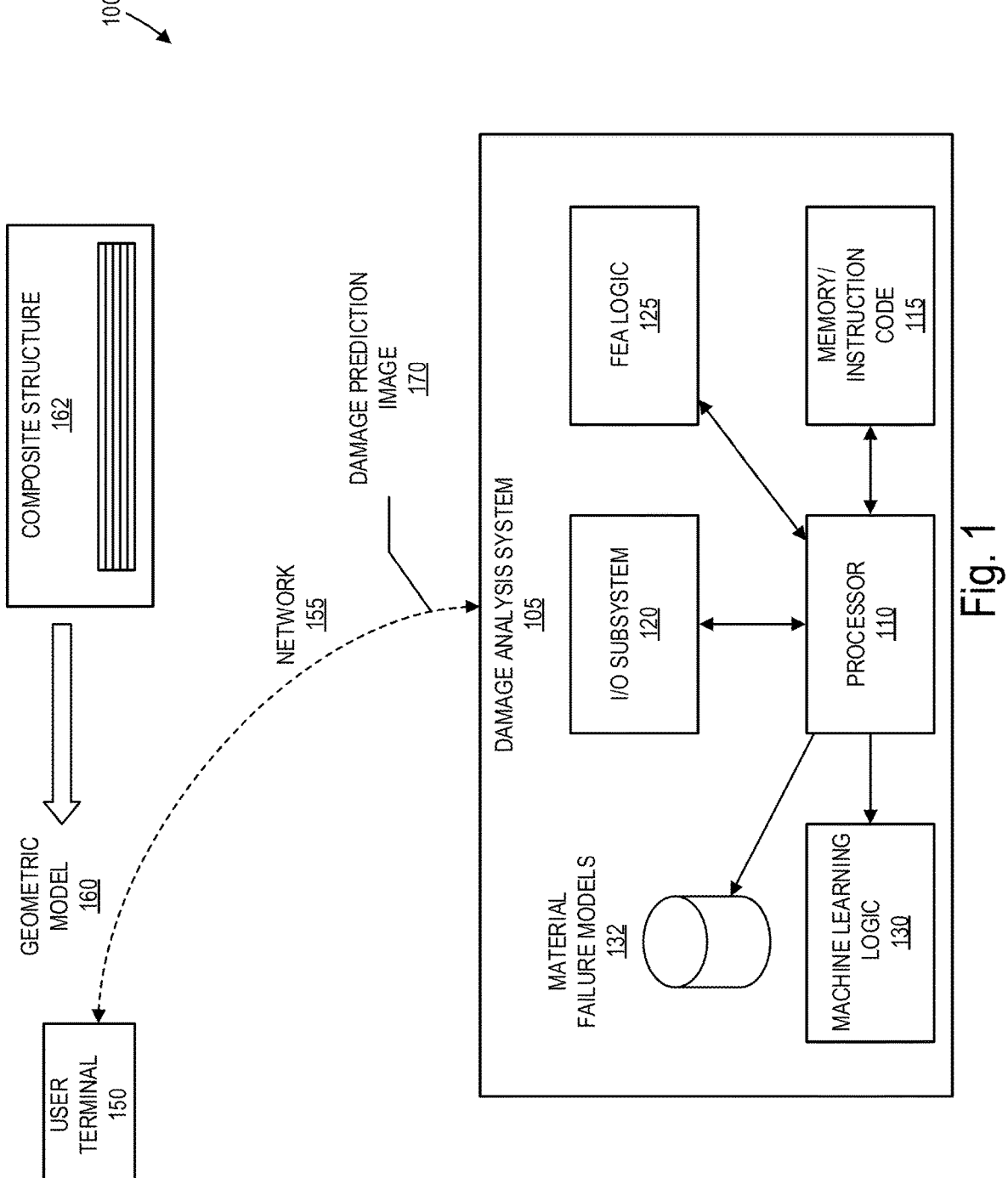
FIG. 1 illustrates an environment that includes various systems/devices that cooperate to facilitate predicting damage to a composite structure, in accordance with example embodiments.

Various examples of systems, devices, and/or methods are described herein. Any embodiment, implementation, and/or feature described herein as being an example is not necessarily to be construed as preferred or advantageous over any other embodiment, implementation, and/or feature unless stated as such. Thus, other embodiments, implementations, and/or features may be utilized, and other changes may be made without departing from the scope of the subject matter presented herein.

Accordingly, the examples described herein are not meant to be limiting. It will be readily understood that the aspects of the present disclosure, as generally described herein, and illustrated in the figures, can be arranged, substituted, combined, separated, and designed in a wide variety of different configurations.

Further, unless the context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

Moreover, terms such as "substantially" or "about" that may be used herein are meant that the recited characteristic, parameter, or value need not be achieved exactly, but that deviations or variations, including, for example, tolerances, measurement error, measurement accuracy limitations and other factors known to those skilled in the art, may occur in amounts that do not preclude the effect the characteristic was intended to provide.

Introduction

As noted above, the prediction of damage to structures that comprise composite materials has proved to be challenging. Some material failure models (MFMs) have been developed to deal with these complex interactions for various typical loading conditions. However, none of these models performs well under, for example, ballistic loading conditions (e.g., the force that a projectile imparts on a structure on impact). Conventional tools do not consider multiple different MFMs in their analysis. Rather, these tools estimate the damage to a composite structure based only on a single MFM.

These and other issues are ameliorated by various damage analysis systems and damage analysis methods disclosed herein. Some examples of these systems and methods utilize one or more deep learning (DL) models to combine inputs from multiple MFMs to predict ply-by-ply damage for a laminated composite structure. Results from multiple MFMs are considered using a trained DL model to give a more accurate and robust capability when predicting ply-by-ply damage for laminated composite structures.

In this regard, composites structures that are modeled with one element for each ply exhibit extremely complex behavior where individual responses are difficult to isolate. Explicit finite-element predictions for these scenarios that depend on a single MFM are subject to large errors or variances, especially when parameters of the composite structures are changed (e.g., number of plies, size of the structure, curvature of structure, etc.). The lack of confidence in single MFMs has held back the widespread acceptance of these methods for predicting, for example, ballistic threshold velocity. Aggregating predictions from separate MFMs using a DL model facilitates the representation of different physical properties, multiple failure modes, and complex failure behavior.

The use of MFMs is applicable to explicit finite-element analysis using progressive damage material models, particularly stress/strain-based failure models, fracture mechanics-based models, and continuum damage-based failure models. As an example, LS-DYNA MAT162 (a commercially available material model developed by the Livermore Software Technology Corporation) uses a stress-based approach to predict damage, while LS-DYNA MAT261 (also developed by Livermore Software Technology Corporation) uses a fracture-based approach to predict damage. Because a ballistic impact on a ply-by-ply composite structure such as a panel has such complex behavior, it is difficult to distinguish the applicability and accuracy of each MFM individually. Combining predictions from MFMs allows a robust predictive capability that allows the more accurate MFMs to dominate the prediction according to a trained DL model. The trained DL model automatically learns how to combine the MFMs in a way to give the most robust damage prediction.

In some examples, training of the DL model involves generating, by FEA logic, predicted damage due, for example, to a ballistic impact event for a composite structure such as a panel for each of a plurality of MFMs. Training data that specifies the predicted damage for each analysis is input into the DL model along with coefficients associated with each analysis. The coefficients generally correspond to weights that indicate a degree to which the final aggregated results should be influenced by the results of any particular analysis. The results of the DL model (i.e., the prediction) are then compared with actual test data to determine the performance of the DL model. If a target accuracy is not met, the coefficients are recalculated (e.g., using a stochastic gradient descent technique) and the training process is repeated automatically. When the target accuracy is achieved, the DL model (with associated coefficients) is considered to be adequately trained to predict damage.

In some examples, preparing the training data involves capturing images of the damage state of each layer of a composite structure (e.g., a panel). Examples of the damage state include delamination between plies, fiber or matrix failure, penetration, and many combinations of failures. The images can come from an FEA simulation or from non-destructive evaluation data (e.g., x-ray data, ultrasonic inspection data, etc.) of an actual composite panel that was subject to, for example, a ballistic impact. The DL model is trained (e.g., using a stochastic gradient descent technique) to recognize the location and extent of the damage. In some examples, the DL model is trained to quantify the damage in terms of an arbitrary shape having a characteristic length and/or damage area. The trained DL model can then be used to automatically quantify damage having an arbitrary shape in each layer and to build a three-dimensional model of a composite panel damage state. Quantification of the damage in each layer can include, but is not limited to, coordinates of a damage shape, area of the damage shape, and other extent features of the damage shape.

An example of a particular damage analysis system (DAS) disclosed herein that facilitates determining ply-by-ply damage in a composite structure is configured to receive a geometric model that specifies geometric aspects of a composite structure. Some examples of the composite structure correspond to a panel. The geometric model facilitates the performance of finite element analysis (FEA). For instance, an example of the geometric model can be evaluated using an FEA tool such as LS-DYNA.

FEA logic of the DAS applies each of a plurality of material failure models (MFMs) to the geometric model to predict different types of damage to the composite structure due to an applied force or stress. Each MFM relates a force or stress applied to a material to a particular type of damage to the material. For instance, an example of the FEA logic executes the logic of a LS-DYNA MAT162-based MFM to simulate damage caused to each layer of the composite structure defined by the geometric model using stress-based failure criteria. An example of the FEA logic executes the logic of a LS-DYNA MAT162-based MFM to simulate damage caused to each layer of the composite structure defined by the geometric model using fracture-based failure criteria. Some examples of the DAS output a composite image that depicts damage to each ply of the composite image.

FIG. 1 illustrates an example of an environment 100 that includes various systems/devices that cooperate to facilitate predicting damage to a composite structure 162. Example systems/devices of the environment 100 include a damage analysis system (DAS) 105 and a user terminal 150 through which a user interacts with the DAS 105. As described in further detail below, a user, via the user terminal 150, communicates a geometric model 160. In some examples, the geometric model 160 specifies geometric aspects of a composite structure 162 (e.g., a panel formed from layers of materials). In response to receiving this information, the DAS 105 predicts and communicates to the user terminal 105 a damage prediction image 170 associated with the geometric model 160. Some examples of the DAS 105 and the user terminal 150 communicate information to one another via a communication network 155, such as the Internet, a cellular communication network, a WiFi network, etc.

Some examples of the DAS 105 comprise a memory 115, a processor 110, and an input/output (I/O) subsystem 120. Some examples of the DAS 105 comprise finite element analysis (FEA) logic 125, machine learning logic 130 (ML logic), and a material failure model (MFM) repository 132.

The processor 110 is in communication with the memory 115. The processor 110 is configured to execute instruction code stored in the memory 115. The instruction code facilitates performing, by the DAS 105, various operations that are described below. In this regard, the instruction code may cause the processor 110 to control and coordinate various activities performed by the different subsystems of the DAS 105. Some examples of the processor 110 correspond to an ARM®, Intel®, AMD®, PowerPC®, etc., based processor. Some examples of the processor 110 are configured to execute an operating system, such as Windows®, Linux®, Unix®, or a different operating system.

Some examples of the I/O subsystem 120 include one or more input/output interfaces configured to facilitate communications with other systems of the DAS 105 and/or with entities outside of the DAS 105. Some examples of the I/O subsystem 120 are configured to communicate information via a RESTful API or a Web Service API. Some examples of the I/O subsystem 120 implement a web browser to facilitate generating one or more web-based interfaces through which users of the DAS 105 and/or other systems interact with the DAS 105.

Some examples of the FEA logic 125 are configured to predict how different materials will react when a range of stresses are applied. In this regard, the FEA logic 125 is configured to receive a 3-dimensional (3D) model of a component (e.g., the geometric model 160 of the composite structure 162) and to subdivide the 3D model into finite elements (e.g., a collection of smaller, simpler parts). The FEA logic 125 is configured to solve a set of partial differential equations that mathematically apply these stresses to the finite elements to predict how the component will react to the stresses.

Some examples of the ML logic 130 are configured to, alone or in combination with other subsystems of the DAS 105, predict an aggregate prediction of damage to the composite structure 162 (e.g., damage that occurs to different plies of a composite structure 162). Some examples of the ML logic 130 include hardware, software, or a combination thereof that is specifically configured to implement or assist in the implementation of various supervised and unsupervised machine learning models such as one or more of the DL models described above. Within examples, these can involve the implementation of a Holt-Winters algorithm, exponential time smoothing (ETS) algorithm, an artificial neural network (ANN), a recurrent neural network (RNN), convolutional neural network (CNN), a seasonal autoregressive moving average (SARIMA) algorithm, a network of long short-term memories (LSTM), a gated recurring unit (GRU) algorithm. Examples of the ML logic 130 can implement other machine learning (ML) logic and/or AI algorithms.

Some examples of the MFM repository 132 store several material failure models (MFMs). Each MFM corresponds to an equation or algorithm that relates a force or stress applied to a material to a particular type of damage to the material. Some examples of models correspond to or are based on LS-DYNA MAT162 and are executable by FEA software such as LS-DYNA developed by the Livermore Software Technology Corporation. These models facilitate simulating damage to layers of a composite structure 162 using stress-based failure criteria. Some examples of models correspond to or are based on LS-DYNA MAT261 and are similarly executable by FEA software such as LS-DYNA. These models facilitate simulating damage to layers of a composite structure 162 using fracture-based failure criteria. Other models that model damage differently or that model different types of damage can be stored in the MFM repository 132.

Figure 2:
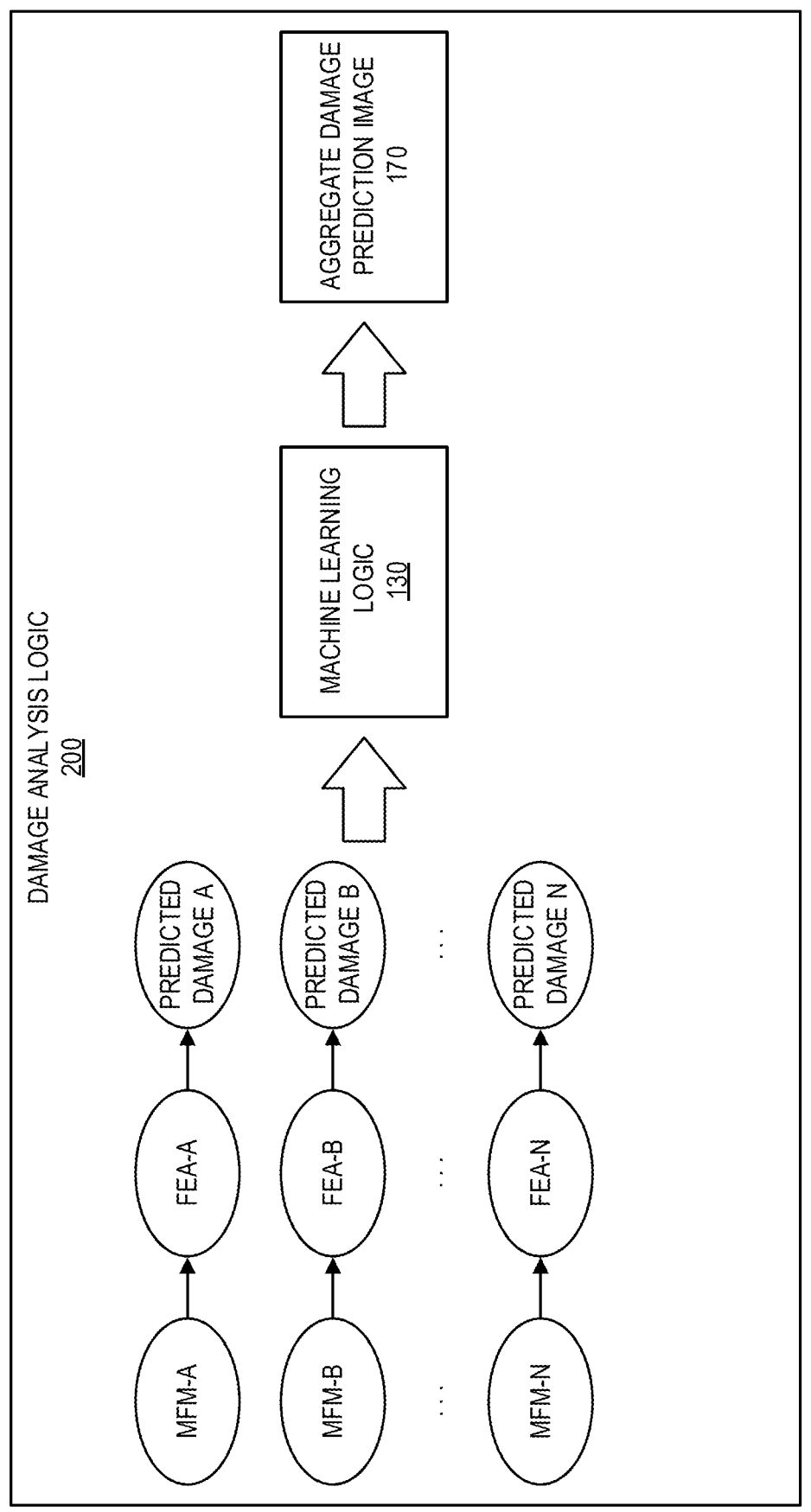
FIG. 2 illustrates damage analysis logic implemented by a damage analysis system of the environment, in accordance with example embodiments.

FIG. 2 illustrates an example of damage analysis logic 200 implemented by some examples of the DAS 105. As shown, a particular MFM (e.g., MFM-A) is executed by FEA logic 125 (e.g., FEA-A), which outputs a corresponding damage prediction (e.g., Predicted Damage A). For instance, the FEA logic 125 executes the logic of a LS-DYNA MAT162-based MFM in simulating forces or stresses applied to a composite structure 162 associated with the geometric model 160. Some examples of the FEA logic 125 output an image that shows damage predicted to occur at one or more layers of the composite structure 162 based on this model. A different MFM (e.g., MFM-B) is executed by FEA logic 125 (e.g., FEA-B), which outputs a corresponding different damage prediction (e.g., Predicted Damage B). For instance, the FEA logic 125 executes the logic of a LS-DYNA MAT261-based MFM in simulating forces or stresses applied to the composite structure 162 associated with the geometric model 160. Similarly, the FEA logic 125 outputs an image that shows damage predicted to occur at one or more layers of the composite structure 162. In some examples, this process is repeated for each MFM stored in the MFM repository 132.

In some examples, the predicted damage images from each of the processes above are input into an input layer of, for example, a set of fully connected neural network layers implemented by the ML logic 130 (e.g., the DL model described above). The ML logic 130 outputs an aggregated damage prediction image 170.

Figure 3:
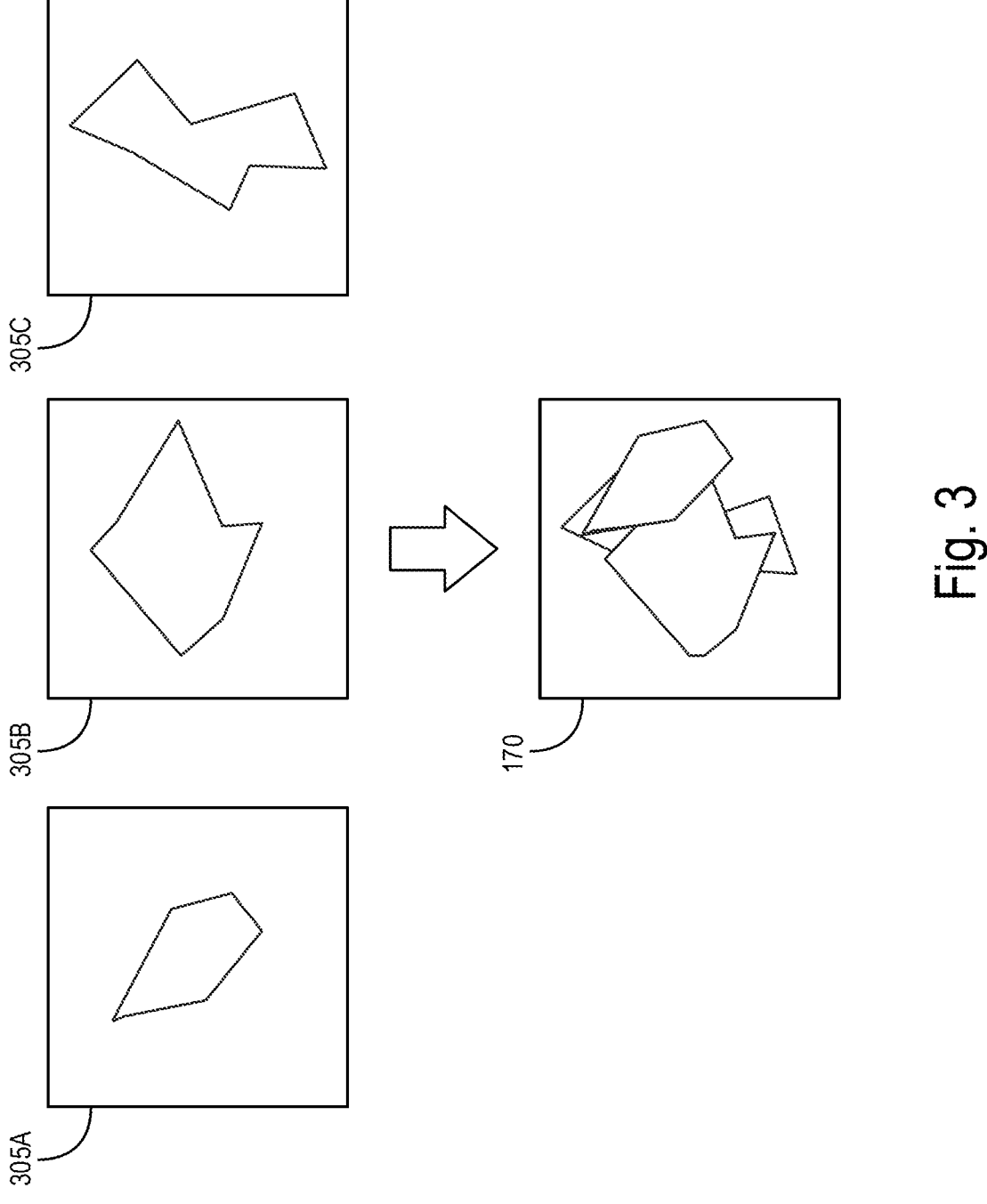
FIG. 3 illustrates an aggregated damage prediction image generated by the damage analysis logic, in accordance with example embodiments.

FIG. 3 illustrates an example of an aggregated damage prediction image 170. In some examples, the aggregated damage prediction image 170 corresponds to a composite of damage prediction images 305A-C associated with different plies of a composite structure 162. For example, a first damage prediction image 305A is damage predicted to occur on a first ply of the composite structure 162, a second damage prediction image 305B is damage predicted to occur on a second ply of the composite structure 162, and a third damage prediction image 305C is damage predicted to occur on a second ply of the composite structure 162.

FIG. 4 illustrates operations 400 performed by some examples of the DAS 105 that facilitate determining ply-by-ply damage in a composite structure 162. In some examples, one or more of these operations are implemented via instruction code, stored in corresponding data storage (e.g., memory 115) of the DAS 105. Execution of the instruction code by corresponding processors of the devices causes these devices to perform these operations 400 alone or in combination with other devices.

The operations at block 405 involve receiving, by a computing system 105, a geometric model 160 that specifies geometric aspects of a composite structure 162. The geometric model 160 facilitates the performance of finite element analysis (FEA).

The operations at block 410 involve applying, by FEA logic 125 of the computing system 105, each of a plurality of material failure models 132 (MFMs) to the geometric model 160 to predict different types of damage to the composite structure 162 due to an applied force or stress. Each MFM 132 relates a force or stress applied to a material to a particular type of damage to the material.

The operations at block 415 involve predicting, by machine learning logic 130 of the computing system 105 and based on each of the predicted different types of damage, an aggregate prediction 170 of damage to the composite structure 162.

In some examples, the operations that involve predicting an aggregate prediction of damage to the composite structure 162 further involve outputting a composite image 170 that depicts damage to each ply of the composite structure 162.

In some examples, the operations that involve applying each of the plurality of MFMs 132 to the geometric model 160 further involve applying, by FEA logic 125 of the computing system 105, an MFM 132 to the geometric model 160 that predicts stressed-based damage to the composite structure 162 due to an applied force or stress.

In some examples, the operations that involve applying each of the plurality of MFMs 132 to the geometric model 160 further involve applying, by FEA logic 125 of the computing system 105, an MFM 132 to the geometric model 160 that predicts fracture-based damage to the composite structure 162 due to an applied force or stress.

In some examples, the operations that involve receiving a geometric model 160 that specifies geometric aspects of a composite structure 162 further involve receiving a geometric model 160 that specifies each ply of the composite structure 162 with one element.

In some examples, the operations that involve predicting, by the machine learning logic 130, an aggregate prediction of damage to the composite structure 162 further involve inputting a plurality of images into an input layer of the machine learning logic 130. Each image depicts damage that is predicted according to a particular MFM 132 to occur to the composite structure 162.

In some examples, the operations that involve inputting into the input layer of the machine learning logic 130 a plurality of images further involve inputting a plurality of images into an input layer of the machine learning logic 130, where each image depicts a binary mask indicative of where damage is predicted according to a particular MFM 132 to occur to the composite structure 162. For example, the image may comprise pixels having the value 0s or 1s. A 0 pixel indicates a region of a ply that is not predicted to have damage, whereas a 1 pixel indicates a region of the ply where damage is predicted to occur.

In some examples, the operations that involve inputting into the input layer of the machine learning logic 130 a plurality of images further involve inputting a plurality of images into an input layer of the machine learning logic 130, where each image depicts a gradient that represents different amounts of damage that are predicted according to a particular MFM 132 to occur to the composite structure 162. For example, the image may comprise pixels having values between 0 and 255. A 0 pixel indicates a region of a ply that is not predicted to have damage, whereas any value other than 0 represents some damage, with the amount of damage being related to the value of the pixel (e.g., a value of 255 represents more damage than value of 100).

In some examples, the operations that involve inputting into the input layer of the machine learning logic 130 a plurality of images further involve inputting into the input layer of the machine learning logic 130 a plurality of images, wherein each image depicts a composite image of damage predicted according to a particular MFM 132 to occur on each layer of the composite structure 162.

In some examples, the operations that involve receiving a geometric model 160 that specifies geometric aspects of a composite structure 162 further involve receiving a geometric model 160 that specifies geometric aspects of a composite panel. And the operations that involve applying, by the FEA logic 125 of the computing system 105, each of a plurality of MFMs 132 to the geometric model 160 to predict different types of damage to the composite structure 162 due to an applied force or stress further involve applying, by the FEA logic 125 of the computing system 105, each of a plurality of MFMs 132 to the geometric model 160 to predict different types of damage to the composite panel due to a ballistic impact.

Figure 5:
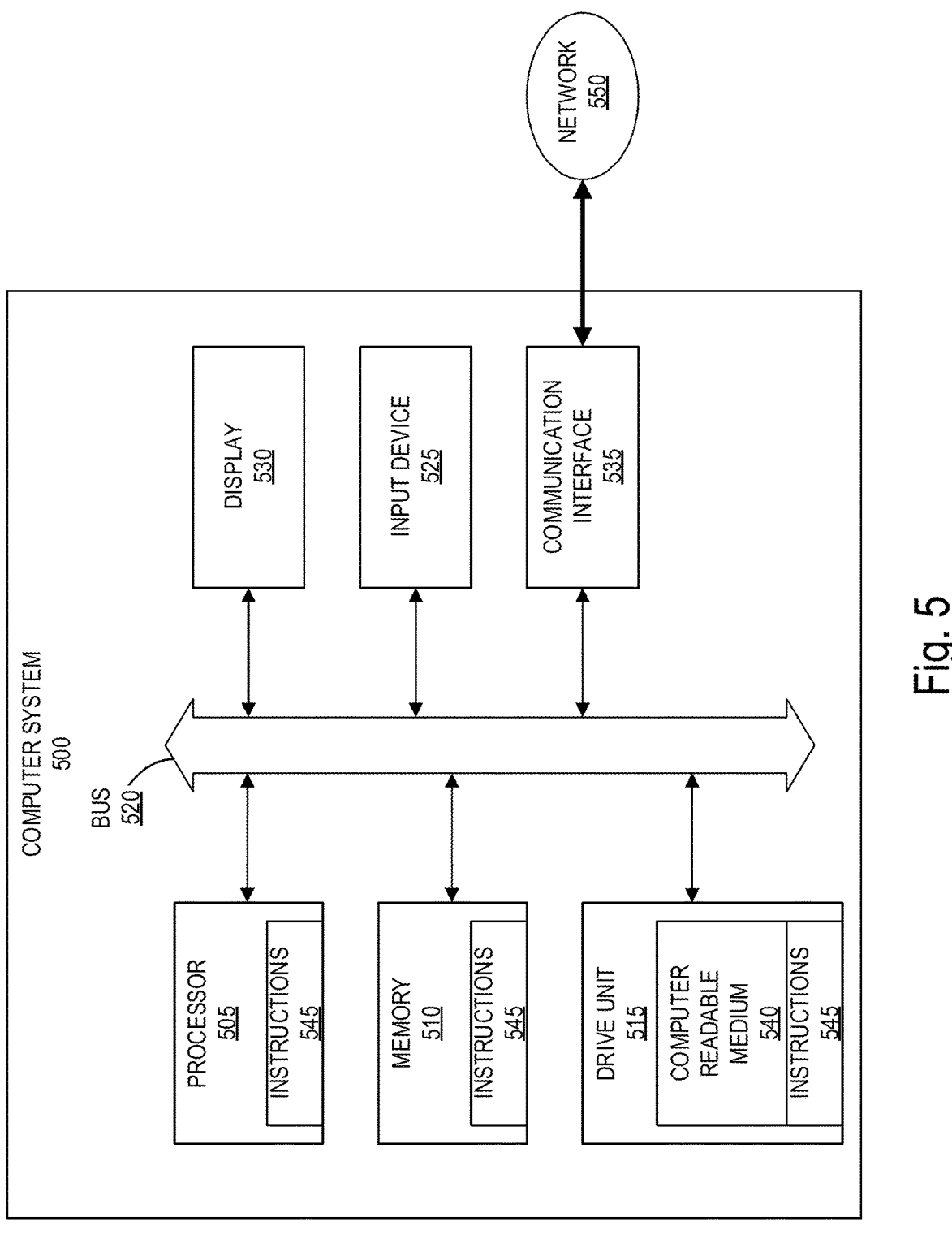
FIG. 5 illustrates a computer system, in accordance with example embodiments.

FIG. 5 illustrates an example of a computer system 500 that can form part of or implement any of the systems and/or devices described above. Some examples of the computer system 500 include a set of instructions 545 that the processor 505 can execute to cause the computer system 500 to perform any of the operations described above. Some examples of the computer system 500 operate as a standalone device or can be connected, e.g., using a network, to other computer systems or peripheral devices.

In a networked example, some examples of the computer system 500 operate in the capacity of a server or as a client computer in a server-client network environment, or as a peer computer system in a peer-to-peer (or distributed) environment. Some examples of the computer system 500 are implemented as or incorporated into various devices, such as a personal computer or a mobile device, capable of executing instructions 545 (sequential or otherwise), causing a device to perform one or more actions. Further, some examples of the systems described include a collection of subsystems that individually or jointly execute a set, or multiple sets, of instructions to perform one or more computer operations.

Some examples of the computer system 500 include one or more memory devices 510 communicatively coupled to a bus 520 for communicating information. In addition, in some examples, code operable to cause the computer system to perform operations described above is stored in the memory 510. Some examples of the memory 510 are random-access memory, read-only memory, programmable memory, hard disk drive, or any other type of memory or storage device.

Some examples of the computer system 500 include a display 530, such as a liquid crystal display (LCD), organic light-emitting diode (OLED) display, or any other display suitable for conveying information. Some examples of the display 530 act as an interface for the user to see processing results produced by processor 505.

Additionally, some examples of the computer system 500 include an input device 525, such as a keyboard or mouse or touchscreen, configured to allow a user to interact with components of system 500.

Some examples of the computer system 500 include a drive unit 515 (e.g., flash storage). Some examples of the drive unit 515 include a computer-readable medium 540 in which the instructions 545 can be stored. Some examples of the instructions 545 reside completely, or at least partially, within the memory 510 and/or within the processor 505 during execution by the computer system 500. Some examples of the memory 510 and the processor 505 include computer-readable media, as discussed above.

Some examples of the computer system 500 include a communication interface 535 to support communications via a network 550. Some examples of the network 550 include wired networks, wireless networks, or combinations thereof. Some examples of the communication interface 535 facilitate communications via any number of wireless broadband communication standards, such as the Institute of Electrical and Electronics Engineering (IEEE) standards 802.11, 802.12, 802.16 (WiMAX), 802.20, cellular telephone standards, or other communication standards.

Accordingly, some examples of the methods and systems described herein are realized in hardware, software, or a combination of hardware and software. Some examples of the methods and systems are realized in a centralized fashion in at least one computer system or in a distributed fashion where different elements are spread across interconnected computer systems. Any kind of computer system or other apparatus adapted for carrying out the methods described herein can be employed.

Some examples of the methods and systems described herein are embedded in a computer program product, which includes all the features that facilitate the implementation of the operations described herein and which, when loaded in a computer system, cause the computer system to perform these operations. A computer program as used herein refers to an expression, in a machine-executable language, code or notation, of a set of machine-executable instructions intended to cause a device to perform a particular function, either directly or after one or more of a) conversion of a first language, code, or notation to another language, code, or notation; and b) reproduction of a first language, code, or notation.

While the systems and methods of operation have been described with reference to certain examples, it will be understood by those skilled in the art that various changes can be made, and equivalents can be substituted without departing from the scope of the claims. Therefore, it is intended that the present methods and systems are not limited to the particular examples disclosed but that the disclosed methods and systems include all embodiments falling within the scope of the appended claims.

The invention claimed is:

1. A computer-implemented method for determining ply-by-ply damage in a three-dimensional (3D) composite structure, method comprising:

receiving a 3D geometric model at a computing system, wherein the 3D geometric model specifies geometric aspects of the 3D composite structure, and wherein the 3D geometric model facilitates performance of finite element analysis (FEA);

applying each material failure model (MFM) of a plurality of MFMs to the 3D geometric model using FEA logic of the computing system, wherein the plurality of MFMs are configured to predict different types of damage to the 3D composite structure due to an applied force or stress, and wherein each MFM relates the applied force or stress to a particular type of damage to a material;

generating a respective damage prediction image for each ply of the 3D composite structure using the FEA logic and for each MFM of the plurality of MFMs;

inputting a plurality of damage prediction images from the plurality of MFMs into an input layer of a deep learning model implemented by machine learning logic of the computing system; and generating an aggregate prediction of damage to the 3D composite structure using the deep learning model, wherein:

the aggregate prediction is based on the plurality of damage prediction images, the aggregate prediction comprises a 3D composite image, and the 3D composite image identifies a respective damage location and a respective extent of the damage for each ply of the 3D composite structure.

2. The computer-implemented method according to claim 1, wherein generating the aggregate prediction comprises: outputting the 3D composite image.

3. The computer-implemented method according to claim 1, wherein an MFM of the plurality of MFMs predicts stressed-based damage to the 3D composite structure due to the applied force or stress.

4. The computer-implemented method according to claim 1, wherein an MFM of the plurality of MFMs predicts fracture-based damage to the 3D composite structure due to the applied force or stress.

5. The computer-implemented method according to claim 1, wherein the 3D geometric model specifies each ply of the 3D composite structure with one element.

6. The computer-implemented method according to claim 1, wherein each damage prediction image of the plurality of damage prediction images depicts the damage that is predicted according to a particular MFM to occur to the 3D composite structure.

7. The computer-implemented method according to claim 1, wherein each damage prediction image of the plurality of damage prediction images depicts a binary mask indicative of where the damage is predicted according to a particular MFM to occur to the 3D composite structure.

8. The computer-implemented method according to claim 1, wherein each damage prediction image of the plurality of damage prediction images depicts a gradient that represents different amounts of damage that are predicted according to a particular MFM to occur to the 3D composite structure.

9. The computer-implemented method according to claim 1, wherein each damage prediction image of the plurality of damage prediction images depicts a respective composite image of damage predicted according to a particular MFM to occur on each layer of the 3D composite structure.

10. The computer-implemented method according to claim 1, wherein:

the 3D geometric model specifies geometric aspects of a composite panel; and the plurality of MFMs predict different types of damage to the composite panel due to a ballistic impact.

11. A computing system that for determining ply-by-ply damage in a three-dimensional (3D) composite structure, the computing system comprising:

one or more instruction storage devices for storing instruction code; and one or more processors in communication with the one or more instruction storage devices, wherein execution of the instruction code by the one or more processors causes the computing system to perform operations comprising:

receiving a 3D geometric model at a computing system, wherein the 3D geometric model specifies geometric aspects of the 3D composite structure, and wherein the 3D geometric model facilitates performance of finite element analysis (FEA);

applying each material failure model (MFM) of a plurality of MFMs to the 3D geometric model using FEA logic of the computing system, wherein the plurality of MFMs are configured to predict different types of damage to the 3D composite structure due to an applied force or stress, and wherein each MFM relates the applied force or stress to a particular type of damage to a material;

generating a respective damage prediction image for each ply of the 3D composite structure using the FEA logic and for each MFM of the plurality of MFMs;

inputting a plurality of damage prediction images from the plurality of MFMs into an input layer of a deep learning model implemented by machine learning logic of the computing system; and generating an aggregate prediction of damage to the 3D composite structure using the deep learning model, wherein:

the aggregate prediction is based on the plurality of damage prediction images, the aggregate prediction comprises a 3D composite image, and the 3D composite image identifies a respective damage location and a respective extent of the damage for each ply of the 3D composite structure.

12. The computing system according to claim 11, wherein generating the aggregate prediction comprises:

outputting the 3D composite image.

13. The computing system according to claim 11, wherein an MFM of the plurality of MFMs predicts stressed-based damage to the 3D composite structure due to the applied force or stress.

14. The computing system according to claim 11, wherein an MFM of the plurality of MFMs predicts fracture-based damage to the 3D composite structure due to the applied force or stress.

15. The computing system according to claim 11, wherein the 3D geometric model specifies each ply of the 3D composite structure with one element.

16. The computing system according to claim 11, wherein each damage prediction image of the plurality of damage prediction images depicts the damage that is predicted according to a particular MFM to occur to the 3D composite structure.

17. The computing system according to claim 11, wherein each damage prediction image of the plurality of damage prediction images depicts a binary mask indicative of where the damage is predicted according to a particular MFM to occur to the 3D composite structure.

18. The computing system according to claim 11, wherein each damage prediction image of the plurality of damage prediction images depicts a gradient that represents different amounts of damage that are predicted according to a particular MFM to occur to the 3D composite structure.

19. The computing system according to claim 11, wherein each damage prediction image of the plurality of damage prediction images depicts a respective composite image of damage predicted according to a particular MFM to occur on each layer of the 3D composite structure.

20. A non-transitory computer-readable medium that stores instruction code that facilitates determining ply-by-ply damage in a three-dimensional (3D) composite structure, wherein execution of the instruction code by one or more processors of a computing system causes the computing system to perform operations comprising:

receiving a 3D geometric model at a computing system, wherein the 3D geometric model specifies geometric aspects of the 3D composite structure, and wherein the 3D geometric model facilitates performance of finite element analysis (FEA);

applying each material failure model (MFM) of a plurality of MFMs to the 3D geometric model using FEA logic of the computing system, wherein the plurality of MFMs are configured to predict different types of damage to the 3D composite structure due to an applied force or stress, and wherein each MFM relates the applied force or stress to a particular type of damage to a material;

generating a respective damage prediction image for each ply of the 3D composite structure using the FEA logic and for each MFM of the plurality of MFMs;

inputting a plurality of damage prediction images from the plurality of MFMs into an input layer of a deep learning model implemented by machine learning logic of the computing system; and generating an aggregate prediction of damage to the 3D composite structure using the deep learning model, wherein:

the aggregate prediction is based on the plurality of damage prediction images, the aggregate prediction comprises a 3D composite image, and the 3D composite image identifies a respective damage location and a respective extent of the damage for each ply of the 3D composite structure.

* * * * *